United States Patent Office 3,790,546
Patented Feb. 5, 1974

3,790,546
PROCESS FOR THE PREPARATION OF TRANS-POLYPENTENAMER
Nikolaus Schön and Gottfried Pampus, Leverkusen, and Josef Witte, Cologne-Stammheim, Germany, assignors to Bayer Aktiengesellschaft, Leverkusen, Germany
No Drawing. Original application June 25, 1969, Ser. No. 836,633, now abandoned. Divided and this application June 1, 1972, Ser. No. 258,749
Claims priority, application Germany, July 10, 1968, P 17 70 844.0
Int. Cl. C08f 1/34
U.S. Cl. 260—93.1   4 Claims

ABSTRACT OF THE DISCLOSURE

Catalyst for polymerizing cyclopentene comprising:
(a) A reaction product of a tungsten or tantalum halide and an epoxide;
(b) An organoaluminum compound and a process for polymerizing cyclopentene.

CROSS-REFERENCE TO RELATED APPLICATION

This application is a division of application Ser. No. 836,633, filed June 25, 1969, and now abandoned.

As is well known, cyclopentene can be polymerized using organometallic mixed catalysts of alkyl aluminum compounds and tungsten salts. Ring opening takes place and unsaturated hydrocarbon molecules in which the double bonds are mainly in the trans-configuration are formed. Thus in British patent specification 1,010,860 a process is described in which trans-polypentenamer is obtained by bulk polymerization of cyclopentene. The quantities of catalyst indicated, however, are very high and moreover it is very difficult to control the temperature in bulk polymerizations, especially if the polymerizations are not stopped when the amount converted is still small. Long reaction times and unfavorable yields are further disadvantages. The object of British patent specification 1,062,367 is a process for the preparation of trans-polypentenamer which uses catalyst obtained by reacting tungsten salts with compounds containing —O—O— or —O—H— bonds and an organoaluminum compound. The catalyst consumption figures given are also very high and the yields of 30 to 50% are too low to be of technical interest.

Since in the above mentioned processes the preparation of catalyst is a heterogeneous reaction between tungsten salts and an aluminum alkyl compound, if desired with the addition of a third component, the reproducibility of the process would appear to provide serious difficulties. It is only in solution that catalyst from heavy metal complexes can be prepared in a reproducible way, so that the process of polymerization can be controlled.

If the catalyst is prepared in solution, it is found that large quantities of solvent are needed for the tungsten compound, owing to the low solubility of the tungsten compounds which are used, e.g. $WCl_6$, $WOCl_4$ etc., in hydrocarbons. In a continuous polymerization process, this would constitute a heavy load on the solvent cycle especially as it is advisable when preparing tungsten halide solutions to use pure solvents, e.g. free of olefins in order to avoid side reactions, e.g. cationic alkylation.

A process for the preparation of transpolypentenamer by polymerization of cyclopentene, in solution in an organic solvent and in the presence of a catalyst has now been found wherein the catalysts used are organometallic mixed catalysts of (a) a reaction product of a tungsten/halogen compound or of a tantalum compound with an epoxide and (b) an organo aluminum compound.

In the process according to the invention, it is advantageous to maintain a molar ratio of tungsten to aluminum of between 1:0.1 and 1:10 or a molar ratio of tantalum to aluminum of between 1:1 and 1:10.

Suitable solvents for the process according to the invention are, for example, hydrocarbons and halogenated hydrocarbons such as pentane, hexane, isooctane, benzene, toluene, xylene, cyclohexane, chlorobenzene, chloroform, carbon tetrachloride, tetrachloroethane and tetrachloroethylene. For the polymerization with tungsten-catalysts, it is preferable to use hydrocarbons, whereas with tantalum catalyst, halogenated hydrocarbons are particularly suitable. Solutions of 5–50% by weight of cyclopentene in these solvents may be used for the process, the concentrations preferably being 10 to 30% by weight.

The preparation of catalyst component (a), i.e. of the reaction product of a tungsten/halogen compound or of a tantalum/halogen compound with an epoxide may also be carried out in solution; if desired using the solvents mentioned above. It is advantageous to use the same solvent for the polymerization and for the preparation of the tungsten or tantalum compounds.

The tungsten/halogen compounds used may be, for example, tungsten chlorides such as $WCl_6$, $WOCl_4$ or $WCl_5$ or tungsten bromides such as $WBr_5$. Suitable tantalum compounds are, for example, tantalum chlorides and bromides such as $TaCl_5$ and $TaBr_5$.

The epoxides used for the reaction with these metal halides are preferably aliphatic epoxides. These compounds may be represented by the general formula

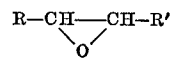

in which R and R' represent hydrogen atoms, alkyl radicals, preferably containing 1–6 carbon atoms, alkoxy radicals preferably containing 1–6 carbon atoms, halogenated (chlorinated or brominated) alkyl radicals, preferably containing 1–6 carbon atoms, or oxyalkylene radicals preferably containing 3–6 carbon atoms. Suitable representatives of these compounds are, for example, ethylene oxide, propylene oxide, butylene oxide, butadiene monoxide, epichlorohydrin, epibromohydrin and allyl glycidyl ether.

The reaction temperature for the reaction of the tungsten and tantalum halogen compounds with epoxides may lie between −30° C. and +100° C. The temperatures employed are preferably between 15 and 60° C.

The molar ratio between tungsten or tantalum halogen compounds and epoxide may be between 1:1 and 1:x where x is the number of halogen atoms. The best results are generally obtained when using 2–3 mols of epoxide per mol of metal halide.

In the preparation of the tungsten or tantalum compounds suitable for use in the process according to the invention, the metal halide compounds may be used as small particles in solvents, a proportion of the metal halide compounds, depending on the desired concentration of the tungsten or tantalum solutions, remaining as a solid at the bottom of the reaction vessel. The epoxides required for the reaction may then be added with stirring. Reaction between the metal halogen compound and the epoxide proceeds exothermically so that in order to keep a certain reaction temperature it may in some cases be necessary to cool the reaction mixture or to regulate the rate at which the epoxide is added. The metal halides present as solids, if any, are dissolved in the course of the reaction. The solutions obtained are generally colored deep red to brown, the intensity of the color decreasing with higher epoxide ratios. It is, of course, also possible to put the epoxide into the reaction vessel and to add the tungsten or tantalum halogen compound.

The reaction times depend mainly on the concentration, the temperature and the particle size of the metal halogen compounds but are generally between 5 and 120 minutes.

If the reaction is carried out at 70° C., for example, reaction times of 30 to 60 minutes are sufficient.

The reaction products of tungsten or tantalum halides and epoxides are readily soluble in the solvents used, in contrast to the halides, so that it is quite easy to prepare solutions with high tungsten or tantalum concentrations.

In the preparation of the organometallic mixed catalysts according to the invention, the reaction products of tungsten or tantalum halides and epoxides are preferably used in the form of their solutions. Suitable organic aluminum compounds for the present process are aluminum trialkyls, aluminum alkyl halides, aluminum alkyl hydrides or aluminum alkyl compounds which have alkoxy or amino groups (alkyl meaning preferably alkyl with 1–6 carbon atoms), e.g. $Al(C_2H_5)_3$, $Al(C_4H_9)_3$, $Al(C_4H_9)_2H$ $Al(C_6H_{13})_3$, $Al(C_2H_5)_2Cl$, $Al(C_4H_9)_2Cl$, $Al(C_2H_5)Cl_2$, $Al(C_4H_9)Cl_2$ or $Al(C_2H_5)_2N(CH_3)_2$. Mixtures of such compounds may also be used.

The catalysts according to the invention are used in quantities so that 0.1 to 4 and preferably 0.4 to 2 millimols of tungsten or tantalum are present for every 100 g. of cyclopentene.

The catalyst components may be added to the monomer solution in any sequence, but the solution of the reaction product of tungsten or tantalum halide and epoxide is preferably added first. The catalyst components may also be reacted separately or the monomer may be added to the solution at the end.

The polymerization process thus may be carried out by first bringing together the solution of tungsten or tantalum compound and the organic aluminum compound and then adding the resulting catalyst solution to the solution of the cyclopentene. The solution of tungsten or tantalum compound and the organic aluminum compound are however preferably added directly to the solution of the cyclopentene. The polymerization is generally carried out at a temperature of between −20° C. and +60° C., preferably −10° C. to +20° C. The addition of catalyst components may also be carried out within this temperature range. The polymerization temperature and the temperature at which the two catalyst components are added to the cyclopentene need not be the same. The polymerization is generally carried out with exclusion of air, moisture and oxygen. It proceeds spontaneously and is slightly exothermic.

The molecular weight of the transpolypentenamer can be adjusted within certain limits by choice of the concentration of tungsten or tantalum, by the molar ratio of aluminum/tungsten (tantalum), the type of aluminum component and the quantity of epoxide. Furthermore, the molecular weight also depends on the degree of purity of the cyclopentene and on the polymerization temperature. After the required degree of conversion of the reactants is achieved, the polymerization is stopped by the addition of e.g. alcohols, carboxylic acids and/or amines. One of the usual products, such as phenyl-β-naphthylamine, 2,6-di-tertiary butyl-4-methylphenol or 2,2′-dihydroxy-3,3′-di-tertiary-butyl-5,5′-dimethyl-diphenyl methane are added to the polymer solutions in quantities of 0.2 to 3% as stabilizers and age resisters. Tackifier resins and oils may also be added at this point.

The polymers can be isolated by precipitation with alcohols or preferably, when carried out on a technical scale, by removing the solvent with steam. The lumps of polymer obtained can then be dried in a drying chamber, if desired in a vacuum, in a screw or on a drying belt. The trans-polypentenamer obtained is a rubbery polymer which can be cross-linked with the known vulcanization systems and worked up into the usual rubber products.

The tungsten or tantalum solutions used for the process according to the invention have the advantage that the heavy metal components can be introduced in reliably reproducible quantities so that the preparation of the catalyst itself becomes reproducible. The solutions of the reaction products of tungsten or tantalum halide compound with epoxide have good storage stability, i.e. the activity of the catalysts prepared from them for polymerizing cyclopentene remains the same over a prolonged period. The essential conditions for technical application of the systems of tungsten and tantalum for the polymerization of cycloolefines are therefore fulfilled.

Compared with the original halides, the reaction products used according to the invention yield substantially more active catalysts for the polymerization of cyclopentene, which is shown by the fact that the necessary catalyst amount is lower and higher yields are obtained. Even with the combination of tungsten halide/peroxide or alcohol according to British Pat. 1,062,367 the activities of the catalysts according to the invention cannot be achieved.

EXAMPLE 1

(a) Reaction of $WCl_6$ with ethylene oxide:

12 g. of fine grained tungsten hexachloride are introduced into 100 ml. of anhydrous benzene under nitrogen and with the exclusion of moisture. Anhydrous ethylene oxide is introduced with stirring into the blue solution which contains $WCl_6$ as solid particles at the bottom. 27 g. of ethylene oxide were introduced within 15 minutes and were completely used up. The temperature of the solution, which assumed a deep brown color rose to 50° C. The $WCl_6$ at the bottom went into solution. The solution was then stirred for ½ hour at 45° C., at the end of which time there were no more solid particles at the bottom.

(b) Reaction of $WCl_6$ with propylene oxide:

12.1 g. of $WCl_6$ were introduced into 100 ml. of anhydrous benzene in the same manner as for the reaction with ethylene oxide. 3.6 g. of propylene oxide were added dropwise with stirring in the course of 10 minutes. The temperature of the reaction solution rose to 55° C. and the $WCl_6$ went completely into solution. The solution was then stirred for ½ hour at 40° C. The color of the solution was dark brown.

EXAMPLE 2

Polymerization of cyclopentene:

Monomer solutions of 650 ml. of benzene and 130 g. of cyclopentene, which had a water content of less than 10 p.p.m., were prepared in reaction vessels equipped with stirrers under a nitrogen atmosphere and with the exclusion of moisture. The cyclopentene contained as impurities 0.05% of cis-pentadiene-1,3, 0.25% of trans-pentadiene-1,3 and 0.4% of 2-methyl-butene-2.

1.3 millimols of tungsten in the form of the tungsten solutions prepared in Example 1(a) and 1(b) and, for comparison, in the form of solid tungsten hexachloride were added to the monomer solutions with stirring at 0° C. In one experiment, 1.2 mmol of t-butylhydroperoxide was added in addition to 1.3 mmol of tungsten hexachloride. The monomer solutions containing tungsten were cooled to −5° C. and aluminum tri-isobutyl was then added. The viscosity in case of the catalysts prepared with tungsten solutions of Example 1 increased rapidly. The temperatures of all the reaction mixtures were kept between −5° and 0° C. The polymerizations were stopped after 4 hours by stirring into the reaction mixtures 0.5% of 2,2′-dihydroxy-3,3′-ditertiary-butyl - 5,5′ - dimethyl-diphenylmethane and 0.5% of ethanolamine, based on the amount of monomers used, in each case dissolved in 20 ml. of ethanol and 60 ml. of benzene. The polymers were precipitated with ethanol and dried under vacuum at 50° C. The catalyst composition, yields and the properties of the polymer obtained are shown in the following table.

| Experiment | Tungsten component | Molar ratio tungsten/ Al(C₄H₉)₃ | Yield, percent | Limiting viscosity (η) | Structure (IR) trans, percent |
|---|---|---|---|---|---|
| I | Tungsten solution Example 1(a). | 1:1 | 82 | 2.09 | 90.5 |
| II | do | 1:0.6 | 80 | 2.59 | 90.4 |
| III | do | 1:0.8 | 80 | 2.15 | 90.6 |
| IV | do.¹ | 1:0.8 | 82 | 2.16 | 90.8 |
| V | do | 1:1.4 | 74 | 1.25 | 89.4 |
| V | Tungsten solution Example 1(b). | 1:1.2 | 70 | 1.59 | 88.9 |
| VI | WCl₆ | 1:1.5 | 4 | 3.86 | 89.2 |
| VII | WCl₆ plus t-butyl hydroperoxide. | 1:1.4 | 27 | 3.85 | 91.7 |

¹ The experiment was carried out with a tungsten solution which had been kept for 8 days with the exclusion of moisture and under nitrogen at room temperature.

EXAMPLE 3

Other polymerization reactions were carried out under the same conditions as in Example 2, using the tungsten solution prepared in Example 1(a).

| Experiment | Aluminum compound | Molar ratio tungsten/ aluminum | Yield, percent | Limiting viscosity (η) | Structure (IR) trans, percent |
|---|---|---|---|---|---|
| I | Al(C₂H₅)₃ | 1:0.8 | 74 | 1.87 | 89.3 |
| II | Al(C₄H₉)₂Cl | 1:1.6 | 70 | 2.52 | 88.6 |
| III | Al(C₄H₉)₃/ Al(C₄H₉)₂Cl molar ratio 1:1. | 1:1.2 | 82 | 2.34 | 88.5 |

EXAMPLE 4

(a) Reaction of $WCl_6$ with epichlorohydrin:

11.9 g. of fine grained tungsten hexachloride were introduced into 100 ml. of benzene under a nitrogen atmosphere and with the exclusion of moisture. 5.5 g. of epichlorohydrin dissolved in 10 ml. of benzene were added dropwise with stirring in the course of 10 minutes. The color of the solution changed from blue to deep brown and the $WCl_6$ present as a solid substance at the bottom of the vessel underwent complete reaction. The temperature rose to 35 to 40° C. during the addition of epichlorohydrin. The solution, which had no solid substance left at the bottom, was then stirred for 45 minutes.

(b) Polymerization of cyclopentene:

Monomer solutions of 550 ml. of benzene and 100 g. of cyclopentene, which had a water content of less than 10 p.p.m., were prepared in vessels equipped with stirrers under nitrogen and with the exclusion of moisture. In reaction mixtures I and II the cyclopentene contained 0.05% of butene-1. 1 millimol of tungsten in the form of the above mentioned solution prepared by reaction with epichlorohydrin was added to each of the monomer solutions at 0° C. After the reaction mixture has cooled to —5° C., the aluminum alkyl compounds listed in the following table were added with stirring, whereupon the polymerization set in immediately in each case. The temperatures of the reaction mixtures were kept between —5° C. and 0° C. After 4 hours, the polymerizations were stopped by stirring into the reaction mixture in each case 0.5% of 2,2'-dihydroxy-3,3'-ditertiary-butyl-5,5'-dimethyl-diphenylmethane and 1.3% of ethanolamine, based on the amount of monomer used, dissolved in 20 ml. of ethanol and 60 ml. of benzene. The polymers were precipitated with ethanol, kneaded for a short time and dried in a vacuum at 50° C.

| Experiment | Aluminum compound | Molar ratio tungsten/ aluminum | Yield percent | Limiting viscosity (η) | Structure (IR) trans, percent |
|---|---|---|---|---|---|
| I | Al(C₄H₉)₃ | 1:1.6 | 73 | 2.58 | 89.9 |
| II | Al(C₂H₅)₃ | 1:1.4 | 80 | 1.58 | 91.5 |
| III | Al(C₄H₉)₃ | 1:1.8 | 70 | 5.80 | 89.6 |
| IV | Al(C₂H₅)₂Cl | 1:1.8 | 75 | 3.20 | 86.9 |
| V | Al(C₂H₅)₃ | 1:1.4 | 69 | 3.25 | 87.9 |
| VI | Al(C₂H₅)₃ | 1:1.8 | 75 | 2.18 | 89.2 |

When comparing Experiments I and II, it is seen that a polymer of lower molecular weight is obtained with $Al(C_2H_5)_3$. The same applies to Experiments III to VI in which cyclopentene which was free from α-olefines was used. The molecular weights of the polymers obtained by using $Al(C_2H_5)_3$ and $Al(C_2H_5)_2Cl$ were lower than those obtained with $Al(i-C_4H_9)_3$. Moreover, the Experiments V and VI show the influence of the tungsten/aluminum ratio.

EXAMPLE 5

(a) Reaction of $WCl_6$ with butene-1-oxide:

11.8 g. of $WCl_6$ and 100 ml. of anhydrous benzene were introduced into a reaction vessel equipped with stirrer under nitrogen, and 6.5 g. of butene-1-oxide were added dropwise with stirring in the course of 10 minutes. The temperature rose to 45° C. and the dark brown solution which contained hardly any more $WCl_6$ as solid substance at the bottom was stirred for another 30 minutes at 40° C.

(b) Polymerization of cyclopentene:

Polymerization using the tungsten compound prepared with butene-1-oxide was carried out in the same way as in Example 4(b). The cyclopentene contained 0.05% of butene-1. Again, 1 millimol of tungsten was added to the monomer solution of 0° C. Al(i-C₄H₉)₂Cl was added as aluminum component at —5° C. The molar ratio of tungsten/aluminum was 1:1.8. A polymer which has a η value of 2.66 and contained 87.5% of trans-double bonds was obtained in a yield of 74%.

EXAMPLE 6

(a) Reaction of $WCl_6$ with ethyleneoxide:

10 g. of $WCl_6$ and 60 ml. of anhydrous toluene were introduced into a reaction vessel equipped with stirrer under nitrogen. A solution of 3.35 g. of ethylene oxide in 40 ml. of toluene was added dropwise in the course of 16 minutes with stirring. The temperature rose to 40° C. The brown solution was then stirred for ½ hour at 35° C.; no solid substance was then left at the bottom.

(b) Polymerization of cyclopentene:

Cyclopentene was polymerized with this tungsten solution in the same way as in Example 4(b) but using the same quantity of toluene as solvent. The cyclopentene contained 0.05% of butene-1. The aluminum component used was Al(i-C₄H₉)₂Cl. The molar ratio of tungsten/aluminum was 1:1.4. A polymer which had the following properties was obtained in a yield of 80%: Limiting viscosity (η):3.32; trans-double bonds (IR): 87.7%.

EXAMPLE 7

(a) Reaction of $WBr_5$ with ethylene oxide:

11.65 g. of $WBr_5$ and 70 ml. of anhydrous benzene were introduced into a vessel equipped with stirrer under nitrogen. A solution of 1.8 g. of ethylene oxide in 25 ml. of benzene was added dropwise in the course of 15 minutes with stirring, the temperature rising to 40 to 45° C. during the reaction. The dark brown solution was then stirred for 45 minutes at 30° C. The $WBr_5$ had undergone complete reaction and no solid substance was left at the bottom.

(b) Polymerization of cyclopentene:

Cyclopentene which contained 0.075% of butene-1 was polymerized in the same way as in Example 4(b) with the tungsten component obtained from $WBr_5$ and ethylene oxide. The aluminum compound used was Al(C₂H₅) Cl₂. The molar ratio of tungsten/aluminum was 1:2.2, and per 100 g. of cyclopentene one millimol of tungsten were used. A polymer which had the following properties was obtained in a yield of 85%: Mooney viscosity ML4' 100° C.: 85; trans-double bond (IR): 87.5%.

EXAMPLE 8

(a) Reaction of $WOCl_4$ with ethylene oxide:

6.83 g. of $WOCl_4$ and 50 ml. of anhydrous toluene were introduced under nitrogen into a flask equipped with stirrer. A solution of 1.76 g. of ethylene oxide in 30 ml. of toluene was added dropwise in the course of 10 minutes with stirring. The temperature rose to 40° C. The solution was then stirred for one hour at 35° C. A brown solution free from precipitate had formed.

(b) Polymerization of cyclopentene:

The polymerization of cyclopentene with the above tungsten solution was carried out in the same way as in Example 4(b) but using toluene instead of benzene. Again 1 millimol of tungsten was used for 100 g. of cyclopentene which contained 0.05% of butene —1. $Al(C_4H_9)_2Cl$ was chosen as the aluminum component. The molar ratio of tungsten/aluminum was 1:2.0. A polymer which had the following properties was obtained in a yield of 73%: Limiting viscosity ($\eta$):2.33; trans-double bonds (IR): 89.5%.

EXAMPLE 9

(a) Reaction of $TaCl_5$ with ethylene oxide (molar ratio 1:3):

13.3 g. of $TaCl_5$ and 100 ml. of chlorobenzene were introduced into a vessel equipped with stirrer under nitrogen and with the exclusion of moisture. A solution of 4.8 g. of ethylene oxide in 355 ml. of chlorobenzene was added with stirring in the course of 15 minutes; the temperature rising to 35–40° C. The tantalum pentachloride underwent complete reaction. The solution was stirred for a further 2 hours at 80° C. The brownish solution had a tantalum concentration of 0.08 mol per liter.

(b) 15.1 ml. of the catalyst solution corresponding to 1.22 millimol of Ta were added to a mixture of 150 ml. of toluene and 30 g. of cyclopentadiene with exclusion of air and moisture. The reaction mixture is cooled to —20° C. and 7.2 millimols of ethyl aluminum chloride are added. Polymerization sets in after 5 minutes. The polymer is isolated by precipitation with methanol after 3 hours. After drying, 9 g. of a soft, rubbery polymer which has a double bond content of 93% are obtained.

EXAMPLE 10

(a) Reaction of $TaCl_5$ with ethylene oxide in the molar ratio of 1:2:

13.3 g. of $TaCl_5$ were reacted with 3.26 g. of ethylene oxide dissolved in 355 ml. of chlorobenzene under the same conditions as in Example 9(a). The temperature rose to 35 to 38° C. during the reaction. The tantalum solution formed was clear and has a brownish color.

(b) 30.2 ml. of the catalyst solution corresponding to 1.5 millimol of Ta are added to 100 ml. of anhydrous chlorobenzene, 60 g. of cyclopentene are then added, and after cooling to 0° C., 9.0 millimol of ethyl aluminum dichloride are added. Polymerization sets in at once. The polymer is isolated by precipitation with isopropanol at 0° C. after 5 hours.

EXAMPLE 11

(a) Reaction of $TaCl_5$ with epichlorohydrin:

9.9 g. of tantalum pentachloride and 100 ml. of anhydrous chlorobenzene are introduced into a reaction vessel under nitrogen, and 5.1 g. of epichlorohydrin dissolved in 20 ml. of chlorobenzene are added with stirring in the course of 10 minutes. During the addition of epichlorohydrin, the temperature rose to 60° C. The tantalum pentachloride underwent complete reaction. The clear, yellow brown solution was then stirred for one hour, the temperature gradually falling to 25° C.

(b) A mixture of 120 ml. of chlorobenzene and 30 g. of cyclopentene is cooled to —20° C. and 1.0 millimol of Ta in the form of the catalyst solution prepared as described above is added followed by 5.0 millimol of ethyl aluminum dichloride and the temperature is kept at —20° C. for 3.5 hours with stirring. The polymer is then precipitated with alcohol and dried. The yield is 26 g. The double bonds present in the polymer (about 90% of the theory) have a trans/cis ratio of 4.1.

EXAMPLE 12

(a) Reaction of $WCl_6$ with

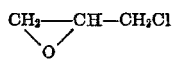

9.9 g. of $WCl_6$ (25 mmol) are introduced into a stirrer flask equipped with dropping funnel and nitrogen supply. 100 ml. of anhydrous toluene are added with exclusion of moisture. A mixture of 4.62 g.

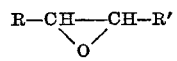

and 18.3 ml. of toluene is added dropwise in the course of 40 minutes with stirring. The reaction mixture is then stirred for a further hour. The solution is 0.2 molar with respect to tungsten.

(b) Polymerization of cyclopentene:

900 ml. of toluene and 200 g. of cyclopentene are introduced into a vessel equipped with stirrer with exclusion of oxygen and moisture. 2.0 ml. of the catalyst solution described under (a) (=0.4 mmol of tungsten) are then added and the mixture is cooled to —5° C. 2.0 ml. of a molar solution of $Al(C_2H_5)_2Cl$ in toluene are then added. Polymerization starts immediately. The polymerization temperature is allowed to rise slowly to 10° C. in the course of 4 hours. The reaction is then terminated by the addition of a mixture of 100 ml. of toluene, 50 ml. of ethanol, 0.5 ml. of ethanolamine and 1 g. of 2,2-dihydroxy-3,3-ditertiary butyl-5,5-dimethyl diphenylmethane. The polymer is precipitated with ethanol and dried in vacuo at 50° C. Yield: 158 g.=79% conversion; ($\eta$) 25° in toluene=3.3; trans-double bonds=90.6%.

EXAMPLE 13

The following polymerization experiments were carried out with the solution of $WCl_6$ prepared in Example 4(a) and epichlorohydrin:

600 ml. of toluene and 100 g. of cyclopentene are introduced into a vessel equipped with stirrer under nitrogen and with exclusion of moisture. The water content of the monomer solution was less than 10 p.p.m. The cyclopentene was free from $\alpha$-olefines. The aluminum component was added at —5° C. to the monomer solution, and 1 mmol of tungsten in the form of the solution of the reaction product of $WCl_6$ and epichlorohydrin was then added in each case. The polymerization set in at once. The polymerization temperatures were kept between —5° and 0° C. After 3 hours, the reaction mixtures were worked up as in Example 4(b).

| Reaction mixture | Aluminum compound | Molar ratio tungsten/ aluminum | Yield, percent | Limiting viscosity ($\eta$) | Structure (IR) trans 1,4, percent |
|---|---|---|---|---|---|
| I | $Al(C_2H_5)_3$ | 1:1.8 | 82 | 1.9 | 91.9 |
| II | $Al(C_2H_5)_2Cl$ | 1:1.2 | 80 | 2.25 | 91.2 |

What is claimed is:

1. A process for producing trans-polypentenamer which comprises dissolving cyclopentene in an organic solvent and contacting resulting solution with a catalytic amount of a mixed catalyst of (a) a reaction product at a temperature of —30 to 100° C. of a tantalum chloride or bromide with an aliphatic epoxide and (b) an organic aluminum compound, said aliphatic epoxide being of the formula

R—CH——CH—R'
  \\_O_/ wherein R and R' are hydrogen, alkyl having 1 to 6 carbon atoms, alkoxy having 1–6 carbon atoms, chlorinated alkyl having 1 to 6 carbon atoms, brominated alkyl having 1 to 6 carbon atoms or oxyalkylene having 3 to 6 carbon atoms, the molar ratio of said epoxide to said tantalum chloride or bromide being between 1:1 and 1:X wherein X is the number of chlorine or bromine atoms of said tantalum chloride or bromide and the molar ratio of tantalum to aluminum being between 1:1 and 1:10.

2. The process of claim 1 wherein the tantalum/halogen compound is a tantalum chloride.

3. The process of claim 1 wherein the epoxide is ethylene oxide, propylene oxide, butylene oxide, butadiene monoxide, epichlorohydrin, epibromohydrin or alkyl glycidyl ether.

4. The process of claim 1 wherein said organic solvent is a hydrocarbon or halogenated hydrocarbon.

References Cited
UNITED STATES PATENTS

| | | | |
|---|---|---|---|
| 3,113,986 | 12/1963 | Breslow et al. | 252—43 R |
| 3,129,208 | 4/1964 | Jezl et al. | 260—93.7 |
| 3,277,021 | 10/1966 | Daendliker | 252—431 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |
| 3,476,730 | 11/1969 | Streck et al. | 260—93.1 |
| 3,449,310 | 6/1969 | D'All Asta et al. | 260—93.1 |
| 3,492,278 | 1/1970 | Uranek et al. | 260—93.1 |
| 3,574,138 | 4/1971 | Ziegler et al. | 252—431 R |
| 3,632,849 | 1/1972 | Pampus et al. | 260—93.1 |

FOREIGN PATENTS

| | | | |
|---|---|---|---|
| 6512789 | 4/1966 | Netherlands | 252—43 |

STANFORD M. LEVIN, Primary Examiner

U.S. Cl. X.R.

252—429